United States Patent
Chauvet et al.

(10) Patent No.: US 7,996,408 B2
(45) Date of Patent: Aug. 9, 2011

(54) DETERMINATION OF INDEX BLOCK SIZE AND DATA BLOCK SIZE IN DATA SETS

(75) Inventors: Philip R. Chauvet, Tucson, AZ (US); David Charles Reed, Tucson, AZ (US); Michael Robert Scott, Ocean View, HI (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 12/184,449

(22) Filed: Aug. 1, 2008

(65) Prior Publication Data
US 2010/0030828 A1 Feb. 4, 2010

(51) Int. Cl.
*G06F 17/30* (2006.01)
(52) U.S. Cl. ...................................................... 707/744
(58) Field of Classification Search .............. 707/2, 741; 714/6
See application file for complete search history.

(56) References Cited

U.S. PATENT DOCUMENTS

| 5,602,936 | A | 2/1997 | Green et al. |
| 7,165,059 | B1 | 1/2007 | Shah et al. |
| 7,197,520 | B1 | 3/2007 | Matthews et al. |
| 7,340,492 | B2 | 3/2008 | Cabrera et al. |
| 2004/0205044 | A1* | 10/2004 | Su et al. ............................ 707/2 |
| 2006/0064555 | A1 | 3/2006 | Prahlad et al. |
| 2006/0085614 | A1 | 4/2006 | Sakai et al. |
| 2009/0217085 | A1* | 8/2009 | Van Riel et al. .................. 714/6 |

OTHER PUBLICATIONS

D. Lovelace, et al., "VSAM Demystified", IBM Corporation, Document No. SG24-6105-1, Sep. 2003, pp. 1-524.

* cited by examiner

*Primary Examiner* — Etienne P LeRoux
(74) *Attorney, Agent, or Firm* — Rabindranath Dutta; Konrad Raynes & Victor LLP

(57) ABSTRACT

A plurality of data sets is maintained, wherein each data set comprises an index block and a plurality of data blocks. An index block size is determined for redefining the plurality of data sets, based on an amount of space left unused in index blocks of the plurality of data sets, wherein for determining the index block size greater weight is provided to those index blocks with lesser unused space in comparison to those index blocks with greater unused space. A data block size is determined based on whether the plurality of data blocks is used more frequently for direct processing or used more frequently for sequential processing.

16 Claims, 6 Drawing Sheets

DETERMINATION OF INDEX BLOCK SIZE AND DATA BLOCK SIZE IN DATA SETS

BACKGROUND

1. Field

The disclosure relates to a method, system, and article of manufacture for the determination of index block size and data block size in data sets.

2. Background

Data sets may be organized into blocks, wherein both index blocks and data blocks may be maintained for data sets. In certain computing systems, the size of the index blocks and the size of the data blocks may be determined when the data sets are defined. The determined size of the index blocks and the determined size of the control blocks may affect the performance of computing systems and the utilization of storage space by the computing system. An inappropriately selected index block size or data block size may lead to negative effects on performance in certain computing systems and may also lead to a poor utilization of storage space in certain computing systems.

Various storage access methods may be used to access data sets. In data sets on which a virtual storage access method is applied, the data sets may be organized into control intervals, wherein control intervals are similar to blocks. The size of the control intervals may affect the performance of computing systems and the utilization of storage space by the computing system.

SUMMARY OF THE PREFERRED EMBODIMENTS

Provided are a method, a system, an article of manufacture, and a method for deploying computing infrastructure, wherein a plurality of data sets is maintained, wherein each data set comprises an index block and a plurality of data blocks. An index block size is determined for redefining the plurality of data sets, based on an amount of space left unused in index blocks of the plurality of data sets, wherein for determining the index block size greater weight is provided to those index blocks with lesser unused space in comparison to those index blocks with greater unused space. A data block size is determined based on whether the plurality of data blocks is used more frequently for direct processing or used more frequently for sequential processing.

In certain embodiments, the plurality of data sets is recalled from a secondary storage device to a primary storage device. The determining of the index block size and the data block size is performed during a period in which the plurality of data sets is being recalled from the secondary storage device to the primary storage device.

In certain additional embodiments, if the plurality of data blocks is used more frequently for direct processing then the data block size is set to a smaller size in comparison to a configuration in which the plurality of data blocks is used more frequently for sequential processing.

In further embodiments, each index block includes one or more logical records that comprise: (i) a plurality of keys comprising compressed keys; and (ii) a plurality of relative byte addresses of those data blocks that include the plurality of keys, wherein in response to a request for a record with a specific key, selected relative byte addresses are used to retrieve the record from a selected data block.

In still further embodiments, a block size is a control interval size for a virtual storage access method data set. The plurality of data blocks is redefined based on the determined index block size and the determined data block size during recall of the plurality of data blocks from a secondary storage device to a primary storage device. The redefined plurality of data blocks provides better performance in a computational device and a greater utilization of space in comparison to configurations in which the index block size and the data block size are set to predefined values, wherein by redefining the data blocks while recalling the plurality of data blocks an impact on the computational device that allows usage of the plurality of data blocks is reduced in comparison to the impact of redefining the plurality of data blocks during a time period when recalling is not being performed.

BRIEF DESCRIPTION OF THE DRAWINGS

Referring now to the drawings in which like reference numbers represent corresponding parts throughout.

DETAILED DESCRIPTION

Figure 1:
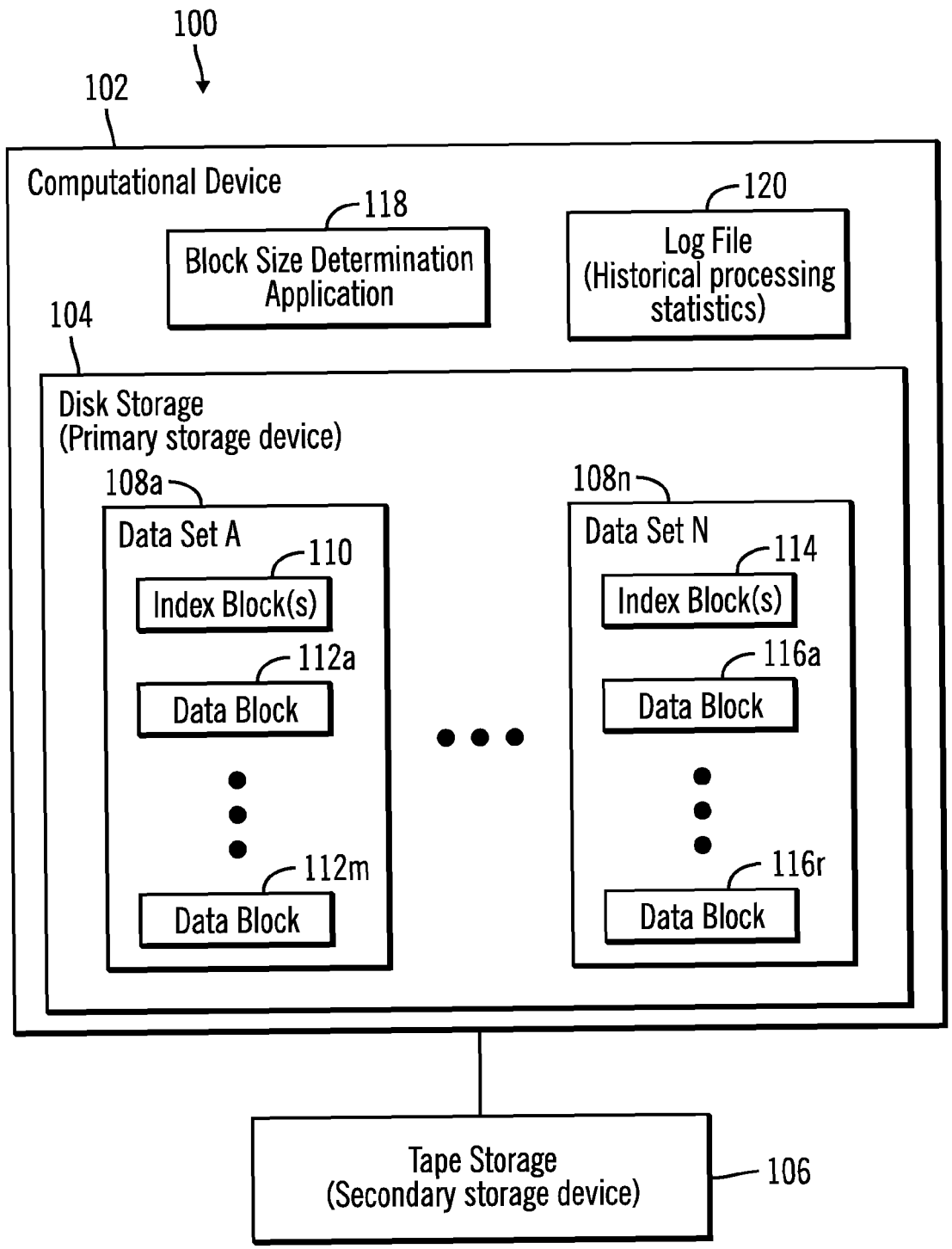
FIG. 1 illustrates a block diagram of a computing environment in which a computational device that includes a primary storage device is coupled to a secondary storage device, in accordance with certain embodiments.

In the following description, reference is made to the accompanying drawings which form a part hereof and which illustrate several embodiments. It is understood that other embodiments may be utilized and structural and operational changes may be made.

Determination of Index Block Size and Data Block Size

Certain embodiments may process a log file that stores usage patterns of data sets. The historical data that may be kept in the log file is processed to analyze the type of usage of the data sets in the past, in order to derive an optimal index block size and data block size for the data sets.

In certain storage management systems, data is migrated from direct access storage devices (DASD) to tapes by a computational device. When the computational device needs the data back in the DASD, the computational device recalls the data back to the DASD from the tapes During this recall of data, certain embodiments may change block sizes, such as control interval sizes, prior to reloading the data for use by the computational device.

In certain embodiments, index control intervals hold pointers to data control intervals. If the index control interval size is too small, there may not be enough room in the index control intervals to store enough entries to access all of the data control intervals. This may cause space to be wasted in the data control intervals. However, if the index control interval size is too large, then space is wasted in the index control intervals.

In certain embodiments, the index control interval may be filled mostly with compressed keys and control information. The amount of space used by the compressed keys may depend on a length of the key of a client computational device and on how well the key can be compressed. An assumption is made in certain virtual storage access methods that a key can be compressed to a length that is half the length of the key. This estimation of the compression may be highly inaccurate. The performance of a compression mechanism may actually be determined by analyzing the data sets after the data sets have been compressed. It may not be possible to determine the extent of compression at allocation time. After the data set is populated with data, certain embodiments can determine how well the compression algorithm performed and how much space was wasted in index control intervals. Certain embodiments may use this information to compute how much space should be reduced from each index control interval. A simple average if used to compute the index control interval may leave some index control intervals to be too small. Certain exemplary embodiments compute a weighted average, providing 10 times more weight to those index control intervals with the bottom 10% of free space. This may result in an index control interval size where very few index control intervals will have too little space, yet such an index control interval size will reduce the wasted space. Having an index control interval size with too little size may actually waste more space overall since it means an entire data control interval or more may not be usable, and as a result the weighted average is used in certain embodiments.

For the data control interval size, a small size is best for direct processing and a large size is best for sequential processing because the entire data control interval is read into a buffer at one time. With sequential processing, the next record to be processed will already be in the buffer. When a virtual storage access method allocates the data set, the virtual storage access method does not know if the file will be used for direct or sequential processing, so the virtual storage access method may just assign a block size. A virtual storage access method may often assign a 4K data control interval size. The user can also specify a data control interval size, but often the user may not select the optimal size. After the data sets have been used for a period of time, historical data exists in log files, wherein the historical data shows if the data sets were accessed sequentially or were accessed via direct processing. Certain embodiments scan the log files for a given data set and determine how the data set is being used. If the data set is being used for direct processing, an exemplary 4K control interval size is assigned. If the data set is being used for sequential processing, an exemplary 32K control interval size is used. If both sequential and direct processing are used on a data set, the exemplary 4K data control interval size will also be assigned, since the direct processing with a larger number of buffers is a superior way to handle a mixed environment. In certain embodiments, the range for data control interval size is between 512 bytes and 32,768 bytes.

In certain embodiments, the user's data set may be redefined when the client computational device is least impacted. A suitable time to redefine the data set is during a recall. When a data set is migrated to tape or DASD, and later recalled, the data set has to be redefined and reloaded with data. So, the client computational device will not see any impact at this time. When a data set is migrated, the unused space in the index may be analyzed, and the usage of the data set may also be analyzed. Control information regarding the migrated data set, the optimal index, and data control interval size may be recorded. That information may then be used in certain embodiments during the new allocation of the data set while recall operations are being performed.

Exemplary Embodiments

FIG. 1 illustrates a block diagram of a computing environment 100 in which a computational device 102 that includes a primary storage device 104 is coupled to a secondary storage device 106. The computational device 102 may be any suitable computational device known in the art, such as, a personal computer, a mainframe computer, a midrange computer, a storage controller, a library manager, a telephony device, a handheld computer, etc.

The primary storage device 104 may comprise a disk based storage device or any other type of storage device. In certain alternative embodiments, the primary storage device 104 may be located outside the computational device 102. The secondary storage device 106 may comprise a tape based storage device or any other type of storage device. In certain embodiments the computational device 102 may migrate one or more data sets 108a . . . 108n from the primary storage device 104 to the secondary storage device 106, wherein the secondary storage device 106 may have a slower response time than the primary storage device 102 but may have a larger storage capacity. The computational device 102 may later recall one or more data sets from the secondary storage device 106 to the primary storage device 104, when such data sets are needed for processing by the computational device 102.

A data set is a collection of data and includes one or more index blocks and a plurality of data blocks. For example, data set 108a is shown to include index blocks 110 and data blocks 112a . . . 112m, whereas data set 108n is shown to include index blocks 114 and data blocks 116a . . . 116r.

The computational device 104 may also include a block size determination application 118 and a log file 120. The block size determination application 118 determines the optimal block sizes for the index and data blocks of a data set, such as any of the data sets 108a . . . 108n. The log file 120 may include statistics on the historical usage patterns of blocks stored in the data sets 108a . . . 108n.

Figure 2:
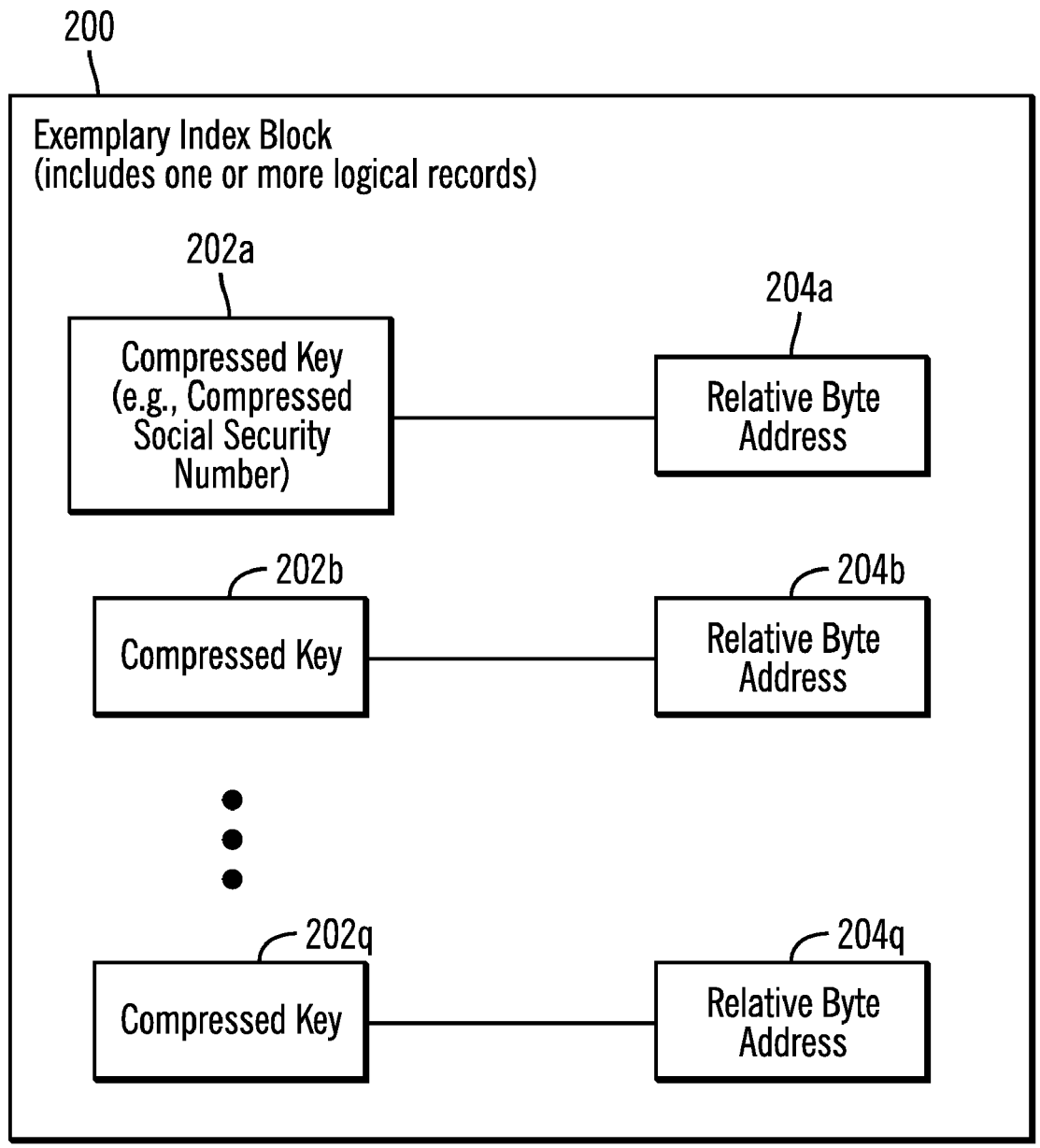
FIG. 2 shows a block diagram of an exemplary index block, in accordance with certain embodiments.

FIG. 2 shows a block diagram of an exemplary index block 200, in accordance with certain embodiments. In certain embodiments the exemplary index block 200 may comprise any of the index blocks 110, 114 shown in FIG. 1.

In certain embodiments, each index block includes one or more logical records that comprise a plurality of keys 202a, 202b, . . . , 202q comprising compressed keys, and a plurality of relative byte addresses 204a, 204b, . . . , 204q of those data blocks that include the plurality of keys 202a, 202b, . . . , 202q. In response to a request for a record with a specific key, selected relative byte addresses are used to retrieve the record from a selected data block. For example, the relative byte address 204a may be used to retrieve a record that includes the key that is stored in the data structure referred to as the compressed key 202a in FIG. 2. To illustrate the contents of an exemplary key, FIG. 2 indicates that an exemplary compressed key 202a is a compressed social security number.

Figure 3:
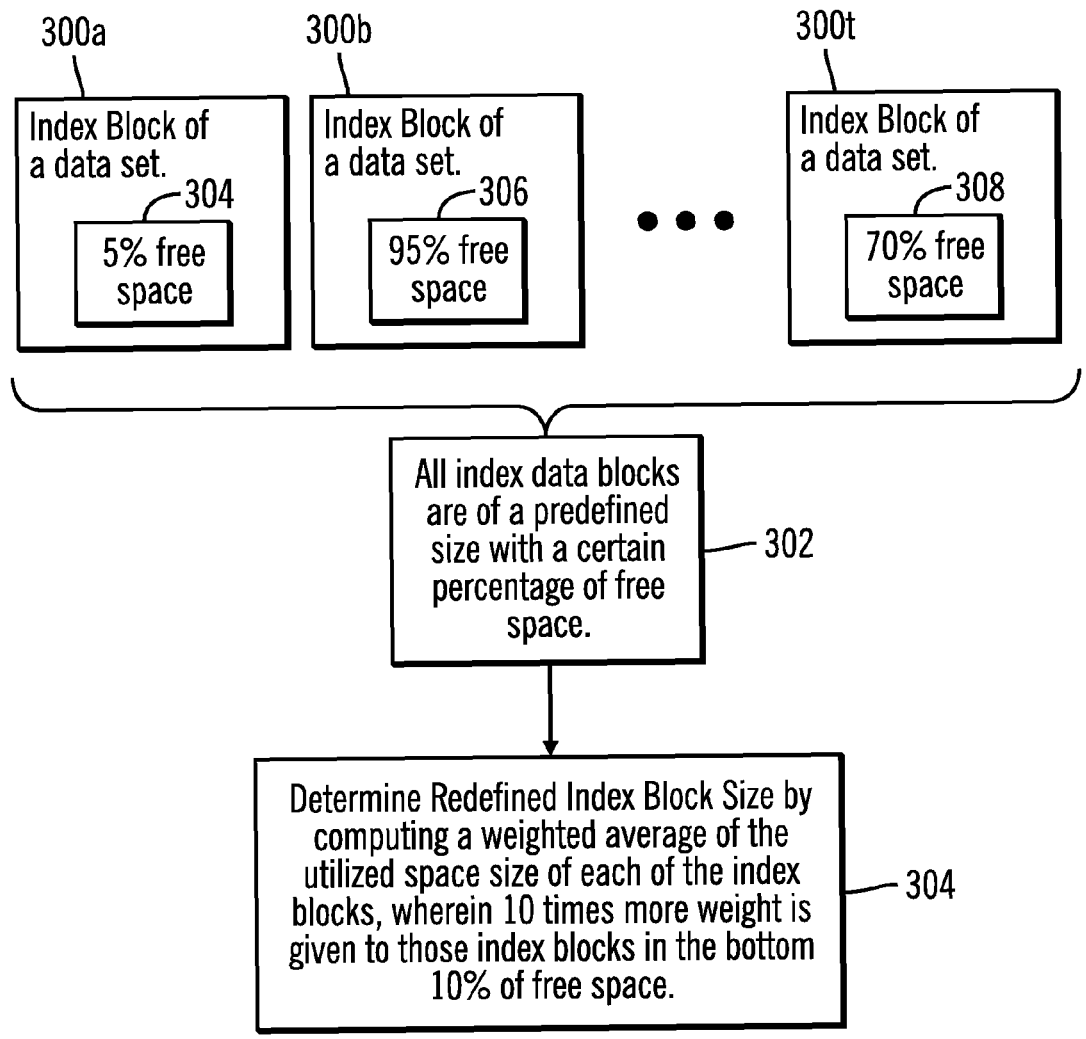
FIG. 3 shows a block diagram that illustrates how index block size may be redefined, in accordance with certain embodiments.

FIG. 3 shows a block diagram that illustrates how an index block size may be redefined by the block size determination application 118 implemented in the computational device 102, in accordance with certain embodiments.

In FIG. 3, a plurality of exemplary index blocks 300a, 300b, . . . , 300t of a plurality of data sets are shown, wherein the data sets may be selected from the data sets 108a . . . 108n shown in FIG. 1. All index data blocks are of a predefined size with a certain percentage of free space (as indicated via reference numeral 302). For example, index block 300a has 5% free space (reference numeral 304), index block 300b has 95% free space (reference numeral 306) and index block 300t has 70% free space (reference numeral 308).

The block size determination application 118 implemented in the computational device 102 may determine a redefined index block size by computing a weighted average of the utilized space size of each of the index blocks 300a, 300b, . . . , 300t, wherein 10 times more weight is given to those index blocks with the bottom 10% of free space. Of course, in alternative embodiments other weightings may be given to the index blocks. In certain embodiments, the determination of an index block size for redefining the plurality of data sets is based on how much space is left unused in index blocks of a plurality of data sets (e.g., data sets 108a . . . 108n of FIG. 1), wherein for determining the index block size greater weight is provided to those index blocks with lesser unused space in comparison to those index blocks with greater unused space.

Figure 4:
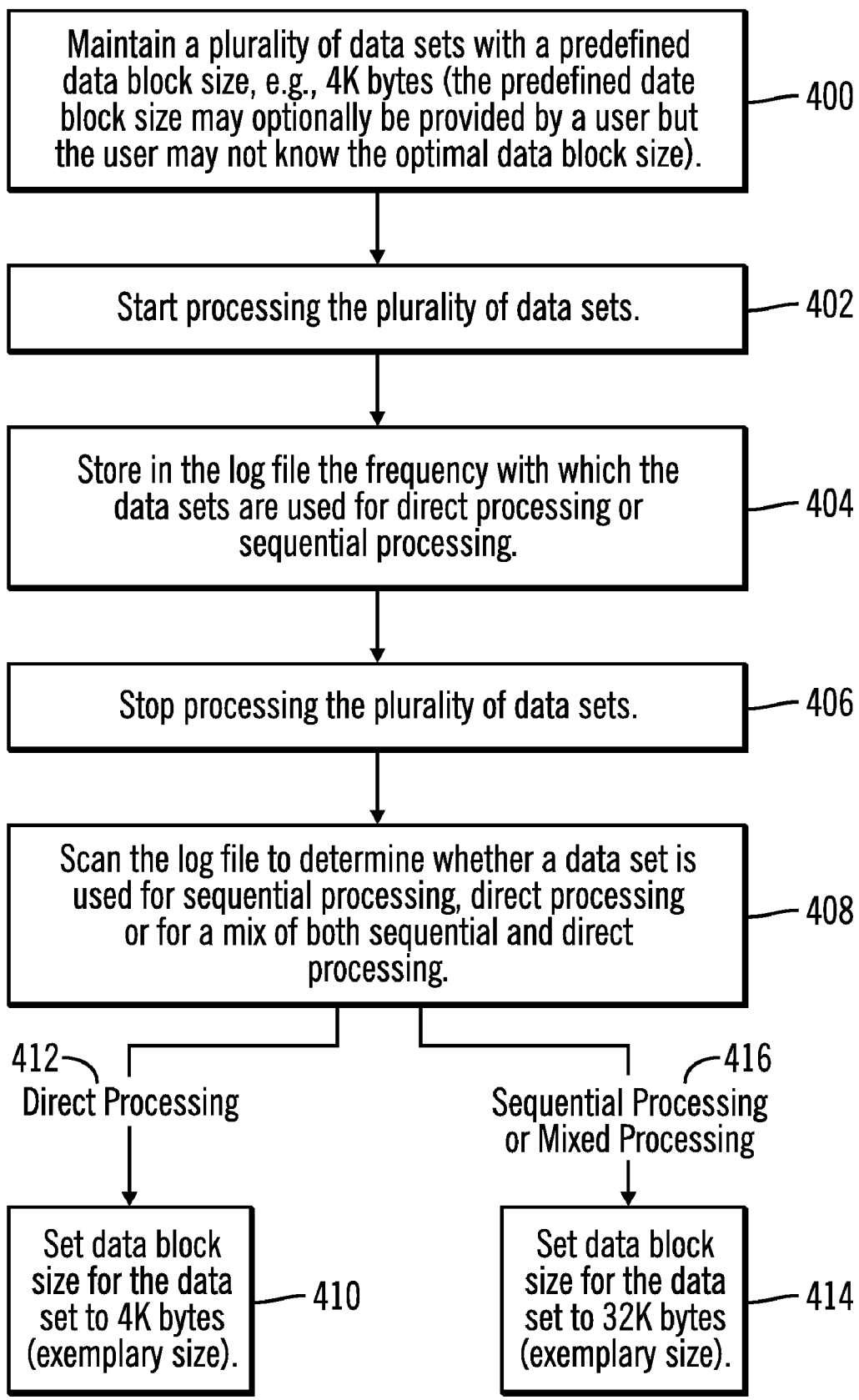
FIG. 4 shows a flowchart that illustrates first operations that determine data block size, in accordance with certain embodiments.

FIG. 4 shows a flowchart that illustrates first operations, in accordance with certain embodiments. In certain embodiments, the first operations may be performed by applications, including the block size determination application 118, included in the computational device 102 of FIG. 1.

Control starts at block 400, wherein a plurality of data sets 108a . . . 108n with a predefined data block size, e.g., 4K bytes, is maintained. In certain embodiments, the predefined date block size may optionally be provided by a user, wherein the user may not know the optimal data block size.

The block size determination application 118 starts (at block 402) processing the plurality of data sets 108a . . . 108n, and stores (at block 404) in the log file 120 the frequency with which the data sets 108a . . . 108n are used for direct processing or sequential processing. Control proceeds to block 406 in which the block size determination application 118 stops the processing of the plurality of data sets 108a . . . 108n. Then, the block size determination application 118 scans the log file 120 to determine (at block 408) whether a data set is used for sequential processing, direct processing or for a mix of both sequential and direct processing.

From block 408, control proceeds to block 410 if the data set is used for direct processing 412, and from block 408 control proceeds to block 414 if the data set is used for sequential processing or mixed processing (reference numeral 416), wherein mixed processing of a data set means that both sequential processing and direct processing have been performed on the data set.

If direct processing is performed on the data set, then the block size determination application 118 sets (at block 410) the data block size for the data set to 4K bytes. The 4K bytes size is an exemplary size and other sizes may be set to the data set. If sequential processing and/or mixed processing are performed on the data set, then the block size determination application 118 sets (at block 414) the data block size for the data set to 32K bytes. The 32K bytes size is an exemplary size and other sizes may be set to the data set. In certain embodiments, if the plurality of data blocks of the data set is used more frequently for direct processing then the data block size is set to a smaller size in comparison to a configuration in which the plurality of data blocks is used more frequently for sequential processing.

Figure 5:
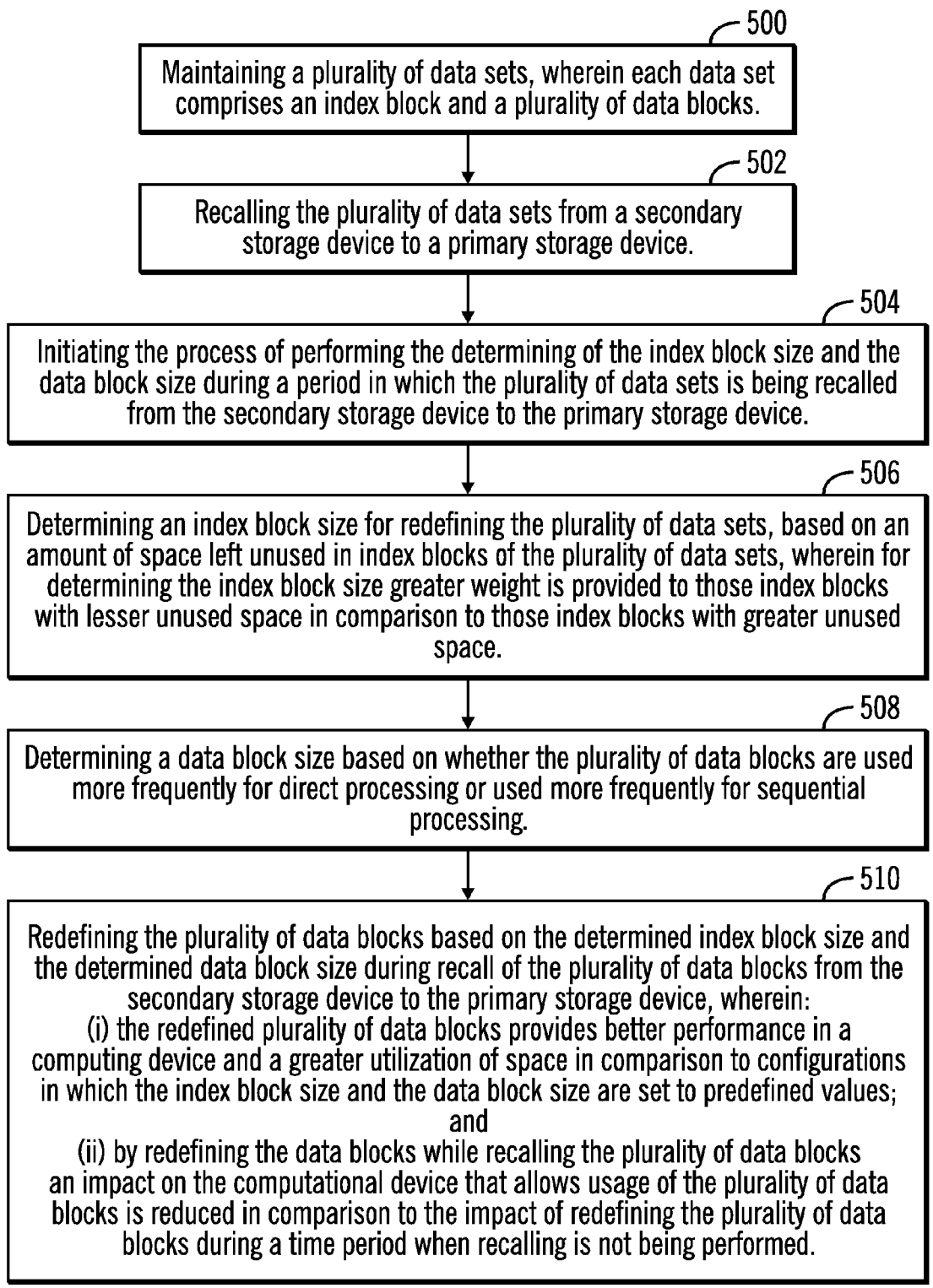
FIG. 5 shows a flowchart that illustrates second operations, in accordance with certain embodiments.

FIG. 5 shows a flowchart that illustrates second operations, in accordance with certain embodiments. In certain embodiments, the second operations may be performed by applications, including the block size determination application 118, included in the computational device 102 of FIG. 1.

Control starts at block 500, wherein a plurality of data sets 108a . . . 108n is maintained, wherein each data set comprises at least one index block 110 and a plurality of data blocks 112a . . . 112m. Control proceeds to block 502 in which a recall of the plurality of data sets from a secondary storage device 106 to a primary storage device 104 is initiated.

During a period in which the plurality of data sets 108a . . . 108n is being recalled from the secondary storage device 106 to the primary storage device 104, an initiation is made (at block 504) of the process of performing the determining of the index block size and the data block size.

Control proceeds to block 506, wherein the block size determination application 118 determines an index block size for redefining the plurality of data sets 108a . . . 108n, based on an amount of space left unused in index blocks of the plurality of data sets 108a . . . 108n, wherein for determining the index block size greater weight is provided to those index blocks with lesser unused space in comparison to those index blocks with greater unused space.

The block size determination application 118 also determines (at block 508) a data block size based on whether the plurality of data blocks 108a . . . 108n is used more frequently for direct processing or used more frequently for sequential processing.

The plurality of data blocks 108a . . . 108n is redefined (at block 510) based on the determined index block size and the determined data block size during recall of the plurality of data blocks from the secondary storage device 106 to the primary storage device 104, wherein:

(i) the redefined plurality of data blocks 108a . . . 108n provides better performance in a computational device 102 and a greater utilization of space in comparison to configurations in which the index block size and the data block size are set to predefined values; and (ii) by redefining the data blocks 108a . . . 108n while recalling the plurality of data blocks 108a . . . 108n an impact on the computational device 104 that allows usage of the plurality of data blocks 108a . . . 108n is reduced in comparison to the impact of redefining the plurality of data blocks 108a . . . 108n during a time period when recalling is not being performed.

Therefore FIG. 1-5 illustrates certain embodiments in which a determination is made of an index block size and a data block size in data sets, such that certain optimality criteria are satisfied. In certain embodiments, the determination of the index block size and data block size and the redefining of the data sets in accordance with the newly determined index block size and data block size is performed during the time when data sets are being recalled from a secondary storage device to a primary storage device. If the redefinition of the data sets is performed at other times, then user applications that use the data sets may have to be restricted from using the data sets during the time when the redefinition of the data sets is being performed.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine, such as a processor or a computer, results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 6:
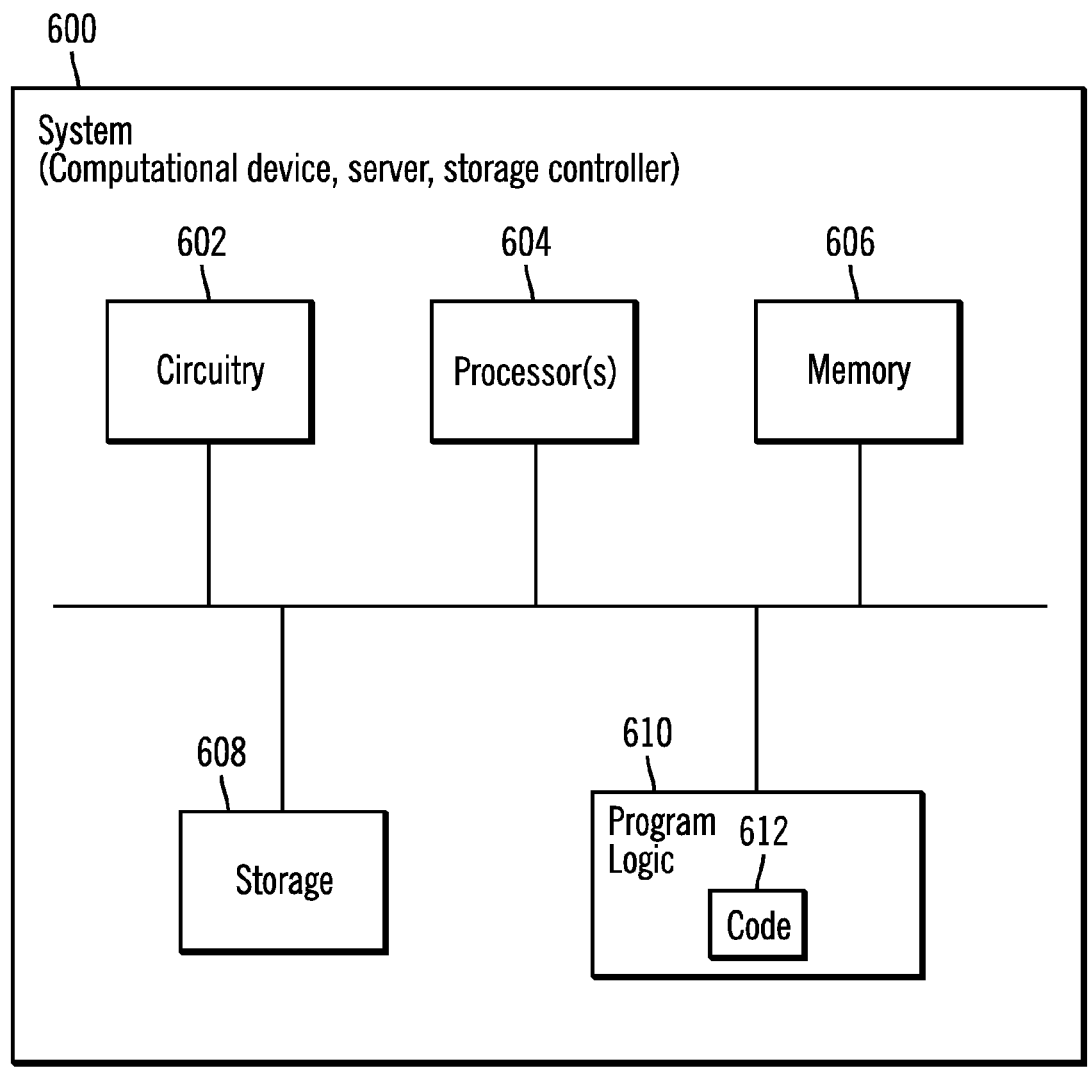
FIG. 6 illustrates a block diagram that shows certain elements that may be included in the computational device in the computing environment of FIG. 1, in accordance with certain embodiments.

FIG. 6 illustrates a block diagram that shows certain elements that may be included in the computational device 102 in accordance with certain embodiments. One or more of the computational devices 102, either individually or collectively may also be referred to as a system 600, and may include a circuitry 602 that may in certain embodiments include a processor 604. The system 600 may also include a memory 606 (e.g., a volatile memory device), and storage 608. The storage 608 may include a non-volatile memory device (e.g., EEPROM, ROM, PROM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instructions or infrastructure by a person or via automated processing, wherein the method for deploying integrates computer-readable code into a computing system, wherein the code in combination with the computing system is enabled to perform the operations of the described embodiments.

At least certain of the operations illustrated in FIGS. 1-6 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   maintaining a plurality of data sets, wherein each data set comprises an index block and a plurality of data blocks;
   determining, via a processor, an index block size for redefining the plurality of data sets, based on an amount of space left unused in index blocks of the plurality of data sets, wherein for determining the index block size greater weight is provided to those index blocks with lesser unused space in comparison to those index blocks with greater unused space; and
   determining a data block size based on whether the plurality of data blocks is used more frequently for direct processing or used more frequently for sequential processing, and in response to determining that the plurality of data blocks is used more frequently for direct processing in comparison to being used for sequential processing, setting the data block size to a smaller size in comparison to a configuration in which the plurality of data blocks is used more frequently for sequential processing.

2. The method of claim 1, the method further comprising:
   recalling the plurality of data sets from a secondary storage device to a primary storage device; and
   performing the determining of the index block size and the data block size during a period in which the plurality of data sets is being recalled from the secondary storage device to the primary storage device.

3. The method of claim 1, wherein each index block includes one or more logical records that comprise:
   a plurality of keys comprising compressed keys; and
   a plurality of relative byte addresses of those data blocks that include the plurality of keys, wherein in response to a request for a record with a specific key, selected relative byte addresses are used to retrieve the record from a selected data block.

4. The method of claim 1, wherein a block size is a control interval size for a virtual storage access method data set, the method further comprising:
   redefining the plurality of data blocks based on the determined index block size and the determined data block size during recall of the plurality of data blocks from a secondary storage device to a primary storage device, wherein:
   (i) the redefined plurality of data blocks provides better performance in a computational device and a greater utilization of space in comparison to configurations in which the index block size and the data block size are set to predefined values; and
   (ii) by redefining the data blocks while recalling the plurality of data blocks an impact on the computational device that allows usage of the plurality of data blocks is reduced in comparison to the impact of redefining the plurality of data blocks during a time period when recalling is not being performed.

5. A system, comprising:
   a memory; and
   a processor coupled to the memory, wherein the processor performs operations, the operations comprising:
   maintaining a plurality of data sets, wherein each data set comprises an index block and a plurality of data blocks;
   determining an index block size for redefining the plurality of data sets, based on an amount of space left unused in index blocks of the plurality of data sets, wherein for determining the index block size greater weight is provided to those index blocks with lesser unused space in comparison to those index blocks with greater unused space; and
   determining a data block size based on whether the plurality of data blocks is used more frequently for direct processing or used more frequently for sequential processing, and in response to determining that the plurality of data blocks is used more frequently for direct processing in comparison to being used for sequential processing, setting the data block size to a smaller size in comparison to a configuration in which the plurality of data blocks is used more frequently for sequential processing.

6. The system of claim 5, the operations further comprising:
   recalling the plurality of data sets from a secondary storage device to a primary storage device; and
   performing the determining of the index block size and the data block size during a period in which the plurality of data sets is being recalled from the secondary storage device to the primary storage device.

7. The system of claim 5, wherein each index block includes one or more logical records that comprise:
   a plurality of keys comprising compressed keys; and
   a plurality of relative byte addresses of those data blocks that include the plurality of keys, wherein in response to a request for a record with a specific key, selected relative byte addresses are used to retrieve the record from a selected data block.

8. The system of claim 5, wherein a block size is a control interval size for a virtual storage access method data set, the operations further comprising:
   redefining the plurality of data blocks based on the determined index block size and the determined data block size during recall of the plurality of data blocks from a secondary storage device to a primary storage device, wherein:
   (i) the redefined plurality of data blocks provides better performance in a computational device and a greater utilization of space in comparison to configurations in which the index block size and the data block size are set to predefined values; and
   (ii) by redefining the data blocks while recalling the plurality of data blocks an impact on the computational device that allows usage of the plurality of data blocks is reduced in comparison to the impact of redefining the plurality of data blocks during a time period when recalling is not being performed.

9. An article of manufacture, wherein code stored in the article of manufacture when executed on a processor causes operations, the operations comprising:
   maintaining a plurality of data sets, wherein each data set comprises an index block and a plurality of data blocks;

determining an index block size for redefining the plurality of data sets, based on an amount of space left unused in index blocks of the plurality of data sets, wherein for determining the index block size greater weight is provided to those index blocks with lesser unused space in comparison to those index blocks with greater unused space; and determining a data block size based on whether the plurality of data blocks is used more frequently for direct processing or used more frequently for sequential processing, and in response to determining that the plurality of data blocks is used more frequently for direct processing in comparison to being used for sequential processing, setting the data block size to a smaller size in comparison to a configuration in which the plurality of data blocks is used more frequently for sequential processing.

10. The article of manufacture of claim 9, the operations further comprising:

recalling the plurality of data sets from a secondary storage device to a primary storage device; and performing the determining of the index block size and the data block size during a period in which the plurality of data sets is being recalled from the secondary storage device to the primary storage device.

11. The article of manufacture of claim 9, wherein each index block includes one or more logical records that comprise:

a plurality of keys comprising compressed keys; and a plurality of relative byte addresses of those data blocks that include the plurality of keys, wherein in response to a request for a record with a specific key, selected relative byte addresses are used to retrieve the record from a selected data block.

12. The article of manufacture of claim 9, wherein a block size is a control interval size for a virtual storage access method data set, the operations further comprising:

redefining the plurality of data blocks based on the determined index block size and the determined data block size during recall of the plurality of data blocks from a secondary storage device to a primary storage device, wherein:

(i) the redefined plurality of data blocks provides better performance in a computational device and a greater utilization of space in comparison to configurations in which the index block size and the data block size are set to predefined values; and (ii) by redefining the data blocks while recalling the plurality of data blocks an impact on the computational device that allows usage of the plurality of data blocks is reduced in comparison to the impact of redefining the plurality of data blocks during a time period when recalling is not being performed.

13. A method for deploying computing infrastructure, comprising integrating computer-readable code into a computing system, wherein the code in combination with the computing system is capable of performing:

maintaining a plurality of data sets, wherein each data set comprises an index block and a plurality of data blocks;

determining an index block size for redefining the plurality of data sets, based on an amount of space left unused in index blocks of the plurality of data sets, wherein for determining the index block size greater weight is provided to those index blocks with lesser unused space in comparison to those index blocks with greater unused space; and determining a data block size based on whether the plurality of data blocks is used more frequently for direct processing or used more frequently for sequential processing, and in response to determining that the plurality of data blocks is used more frequently for direct processing in comparison to being used for sequential processing, setting the data block size to a smaller size in comparison to a configuration in which the plurality of data blocks is used more frequently for sequential processing.

14. The method for deploying computing infrastructure of claim 13, wherein the code in combination with the computing system is further capable of performing:

recalling the plurality of data sets from a secondary storage device to a primary storage device; and performing the determining of the index block size and the data block size during a period in which the plurality of data sets is being recalled from the secondary storage device to the primary storage device.

15. The method for deploying computing infrastructure of claim 1, wherein each index block includes one or more logical records that comprise:

a plurality of keys comprising compressed keys; and a plurality of relative byte addresses of those data blocks that include the plurality of keys, wherein in response to a request for a record with a specific key, selected relative byte addresses are used to retrieve the record from a selected data block.

16. The method for deploying computing infrastructure of claim 13, wherein a block size is a control interval size for a virtual storage access method data set, wherein the code in combination with the computing system is further capable of performing:

redefining the plurality of data blocks based on the determined index block size and the determined data block size during recall of the plurality of data blocks from a secondary storage device to a primary storage device, wherein:

(i) the redefined plurality of data blocks provides better performance in a computational device and a greater utilization of space in comparison to configurations in which the index block size and the data block size are set to predefined values; and (ii) by redefining the data blocks while recalling the plurality of data blocks an impact on the computational device that allows usage of the plurality of data blocks is reduced in comparison to the impact of redefining the plurality of data blocks during a time period when recalling is not being performed.

* * * * *